(12) United States Patent
Crickenberger et al.

(10) Patent No.: US 7,047,885 B1
(45) Date of Patent: May 23, 2006

(54) MULTIPLE PULSE CARTRIDGE IGNITION SYSTEM

(75) Inventors: Andrew B. Crickenberger, Fort Ashby, WV (US); Saleem L. Ghazi, Bethlehem, PA (US)

(73) Assignee: Alliant Techsystems Inc., Edina, MN (US)

( * ) Notice: Subject to any disclaimer, the term of this patent is extended or adjusted under 35 U.S.C. 154(b) by 0 days.

(21) Appl. No.: 09/503,524

(22) Filed: Feb. 14, 2000

(51) Int. Cl.
*F42B 3/10* (2006.01)

(52) U.S. Cl. ............... 102/202.5; 102/200; 102/202; 102/217

(58) Field of Classification Search ............ 102/202.5, 102/217, 202, 200
See application file for complete search history.

(56) References Cited

U.S. PATENT DOCUMENTS

| | | | | |
|---|---|---|---|---|
| 3,315,603 A | * | 4/1967 | Amey et al. | 102/202.7 |
| 3,814,017 A | | 6/1974 | Backstein et al. | |
| 4,239,005 A | | 12/1980 | Simmons | |
| 4,770,099 A | * | 9/1988 | Brede et al. | 102/472 |
| 4,930,421 A | | 6/1990 | Macdonald | |
| 4,949,639 A | * | 8/1990 | Burns | 102/249 |
| 5,485,788 A | * | 1/1996 | Corney | 102/472 |
| 6,543,362 B1 | * | 4/2003 | Muskat | 102/202 |
| 6,889,610 B1 | * | 5/2005 | Boucher et al. | 102/217 |

FOREIGN PATENT DOCUMENTS

| | | |
|---|---|---|
| DE | 198 53 290 A | 5/2000 |
| EP | 0 412 897 A | 2/1991 |

* cited by examiner

*Primary Examiner*—M. Clement
(74) *Attorney, Agent, or Firm*—George A. Leone (57) ABSTRACT

An electronically controlled multi-pulse ignitor ignites a cartridge used to launch a projectile. An electronics module is programmed with a temperature performance profile for the cartridge. A temperature sensor is coupled to supply current cartridge temperature data to the electronics module. A first event ignitor is coupled to the electronics module and initiates a ballistic cycle upon command from the electronics module. A translation mechanism, including a first charge coupled to the first event ignitor, moves the projectile forward to increase the free volume in the cartridge. A second event ignitor, coupled to receive a second event ignition signal from the electronics module, ignites the main propellant charge on receiving the second event ignition signal from the electronics module, where the timing of ignition of the second event ignitor is determined by the temperature performance profile and the current cartridge temperature data.

6 Claims, 10 Drawing Sheets

MULTIPLE PULSE CARTRIDGE IGNITION SYSTEM

U.S. GOVERNMENT RIGHTS

The U.S. Government has interests in this invention pursuant to Contract #DAAA21-87-C-0160 awarded by the Department of the Army.

FIELD OF THE INVENTION

The present invention is in the field of cartridge ignition systems and, more particularly, relates to an electronically controlled dual event or multi-pulse ignitor which can sense the temperature of the cartridge and adjust the ignition for a cartridge.

BACKGROUND OF THE INVENTION

One of the most important design variables in ammunition development is the performance of a cartridge over the operating temperature range. This performance is currently limited by the operating pressure at hot temperatures.

Attempts to improve cartridge performance over a range of temperatures have typically relied on mechanical devices and propellant innovations. Propellant design, for example, has long focused on chemically creating a propellant to reduce performance differences over temperature. A mechanical design which has been explored uses control tube concepts to modify the initial travel of the projectile as a function of temperature using material thermal expansion or bimetallic strips.

In contrast, the instant invention provides an ignition system known as a Smart Cartridge Ignition System, described hereinbelow, that controls the performance of a cartridge so that it is substantially invariant over ambient and cold temperature ranges.

SUMMARY OF THE INVENTION

According to the present invention, an electronically controlled multi-pulse ignitor is provided for a cartridge used to launch a projectile. An electronics module is programmed with a temperature performance profile for the cartridge. A temperature sensor is coupled to supply current cartridge temperature data to the electronics module. A first event ignitor is coupled to the electronics module for initiating a ballistic cycle upon command from the electronics module. A translation mechanism, including a first charge coupled to the first event ignitor, moves the projectile forward to increase the free volume in the cartridge. A second event ignitor, coupled to receive a second event ignition signal from the electronics module, ignites the main propellant charge on receiving the second event ignition signal from the electronics module, wherein the timing of ignition of the second event ignitor is determined by the temperature performance profile and the current cartridge temperature data.

DETAILED DESCRIPTION OF THE PREFERRED EMBODIMENT

Figure 1A:
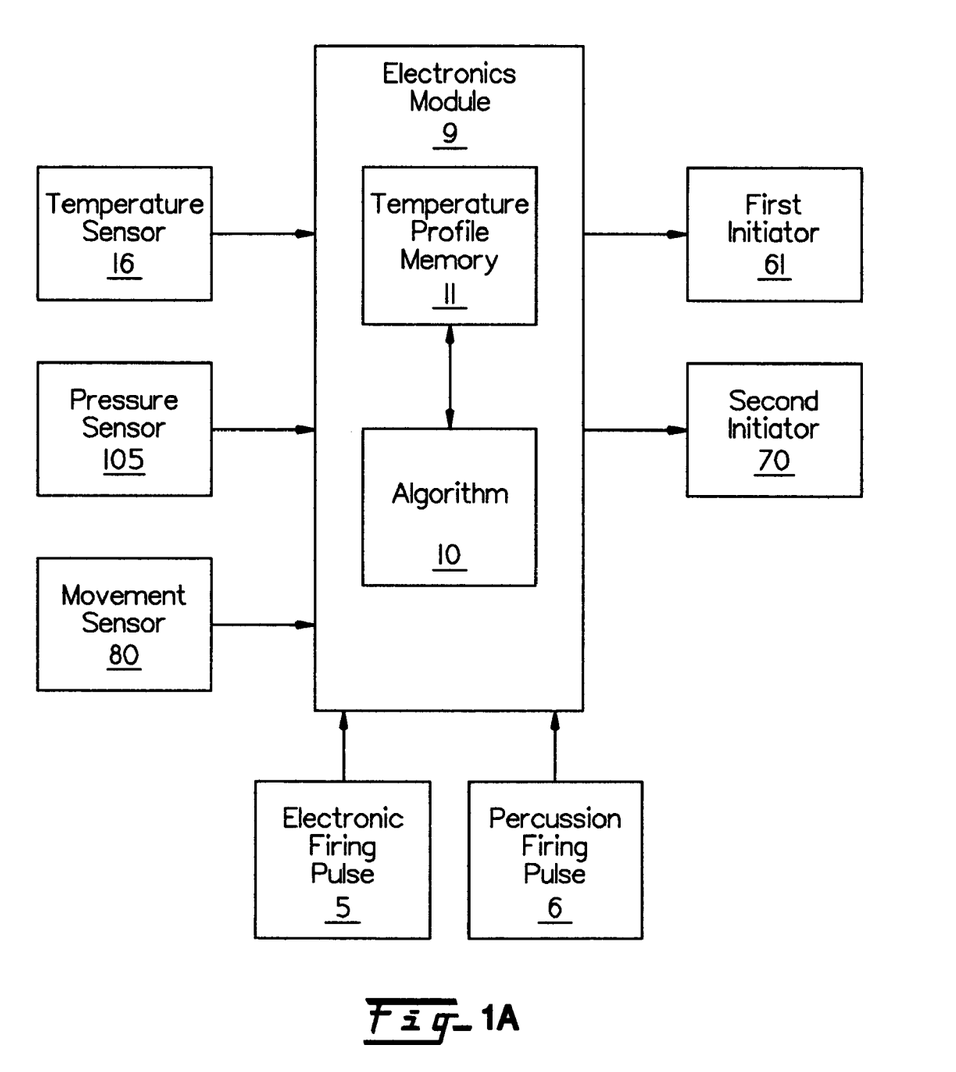
FIG. 1A schematically shows a block diagram for one example of an electronically controlled multi-pulse ignitor system constructed in accordance with the present invention.

Referring now to FIG. 1A, a block diagram for one example of an electronically controlled multi-pulse ignitor system constructed in accordance with the present invention is shown. The system comprises a temperature sensor 16, a pressure sensor 105, a movement sensor 80, an electronics module 9, a first initiator 61 and a second initiator 70. Depending upon the cartridge system being ignited, a firing pulse will be generated either by an electronic firing pulse 5 in the case of an electronically fired cartridge, or a percussive firing pulse 6, in the case of a percussion fired cartridge. Electronics module 9 comprises a temperature profile memory 11 and an algorithm 10. Electronics module 9 includes electronics suitable for processing data and executing algorithm 10. It is contemplated herein that the novel process be constructed, and has been so constructed by the inventors, using standard electronics. Other useful embodiments may be constructed using digital circuitry and/or programmable computer, application specific integrated circuits, or microprocessor devices, components or equivalents using well known design principles.

Temperature profile memory 11 stores a temperature and event delay performance profile for a given cartridge. The temperature profile may be empirically derived from temperature and performance data for a cartridge using standard profiling techniques. The electronics module controls the first initiator 61 and the second initiator 70 by processing temperature data from the temperature sensor 16, pressure sensor 105 and movement sensor 80 with the temperature profile information as discussed in detail below with reference to the figures.

Figure 1B:
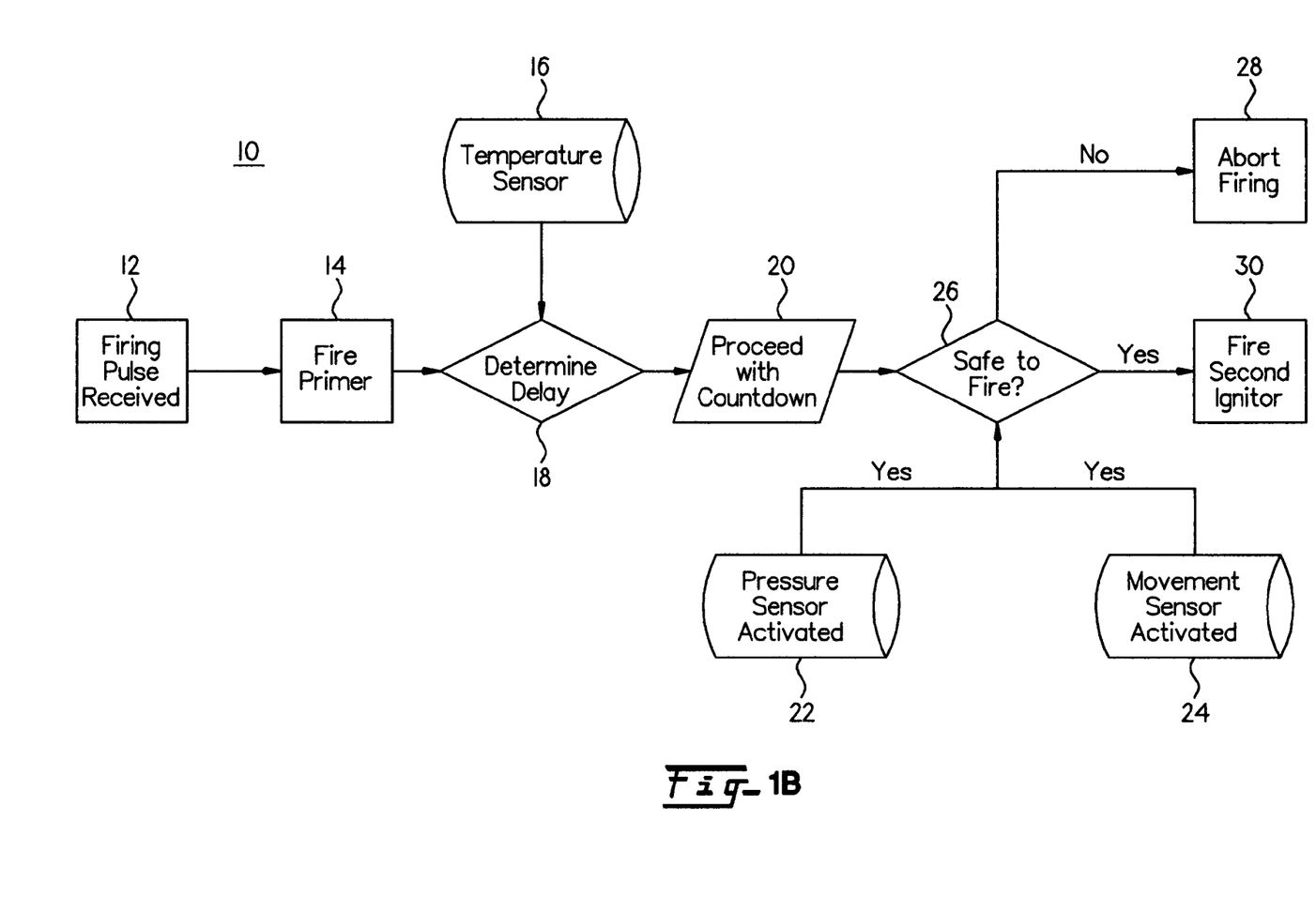
FIG. 1B illustrates a process flow diagram for one example of an electronically controlled multi-pulse ignitor system algorithm constructed in accordance with the present invention.

Referring now to FIG. 1B, a process flow diagram for an electronically controlled multi-pulse ignitor system constructed in accordance with the present invention is shown. The process flow diagram shows one example of an algorithm 10. The algorithm 10 is initiated by the receipt of a firing pulse at event 12. The firing pulse is transmitted to a second event, fire primer event 14, where the first initiator is fired. The fire primer event 14 provides a signal to a decision event 18 for determining an appropriate delay. The decision event 18 receives current temperature data from temperature sensor 16 within the cartridge system. Decision event 18 determines an appropriate delay by comparing the current temperature data with the stored cartridge temperature profile information, and it sends a count down period to event timer 20. Event timer 20 counts down amount of time determined at event 18 before firing the second ignitor.

During the countdown period, a second decision event 26 decides whether or not it is safe to fire the second ignitor. The safe determination is made using a first safety signal 22 from either the pressure sensor 105 and/or a second movement safety signal 24 from the movement sensor 80. If the pressure sensor 105 is activated, the first safety signal 22 is positive, allowing firing. Similarly, if movement is detected from the movement sensor 80, the second safety signal 24 is positive for allowing firing. In one embodiment, if either the pressure sensor activated event 22 or the movement sensor activated event 24 is negative, the safe to fire decision 26 transmits an abort signal to abort firing at event 28. If both the pressure sensor activated event 22 and the movement sensor activated event 24 are positive, the safe to fire decision 26 transmits a firing signal to fire the second ignitor at event 30.

Figure 2:
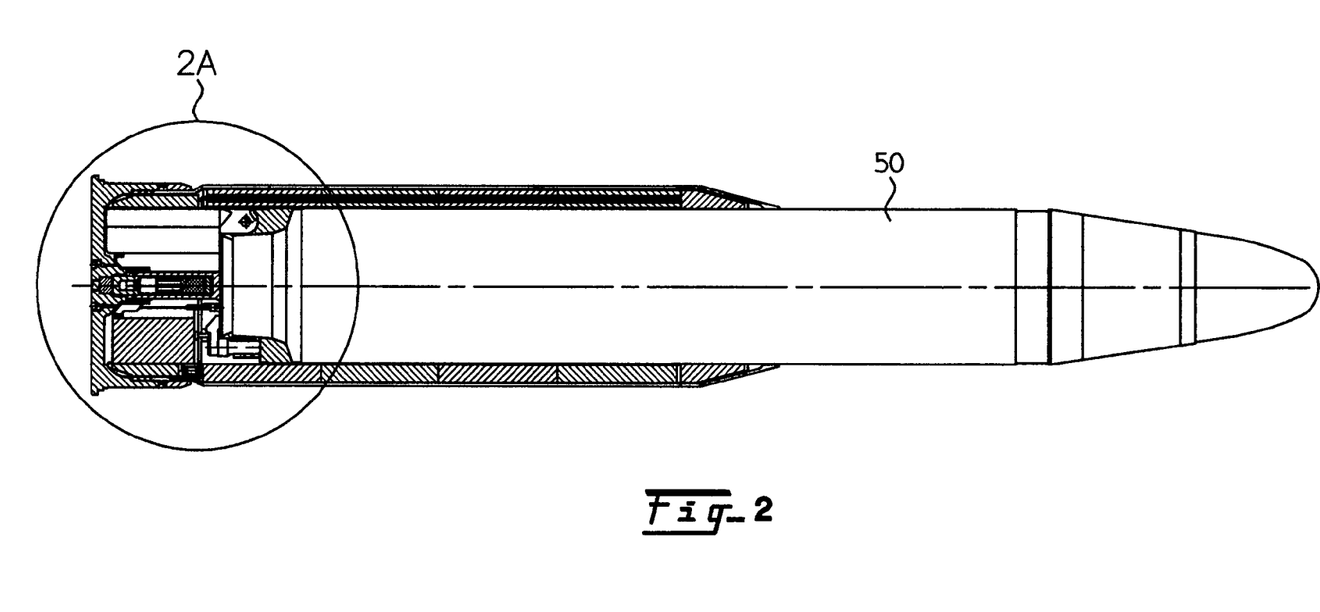
FIG. 2 and FIG. 2A show a partially cut-away view of one example of a cartridge including an electronically controlled multi-pulse ignitor system constructed in accordance with the present invention.
Figure 2A:
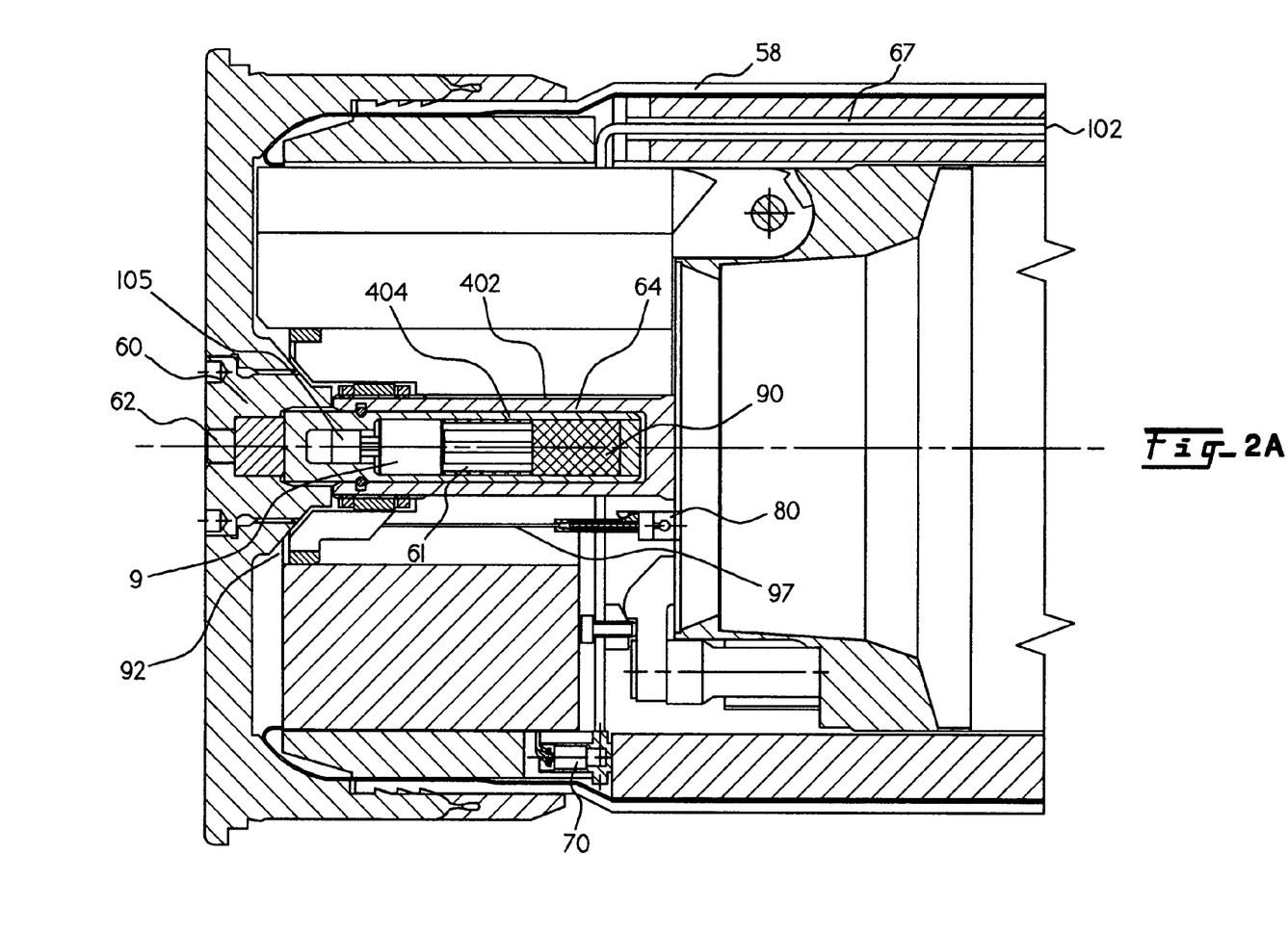

Referring now to FIG. 2 and FIG. 2A, a partially cut-away view of one example of a cartridge including an electronically controlled multi-pulse ignitor system constructed in accordance with the present invention is shown. It will be understood that the configuration shown herein is by way of example and that the invention is not so limited. A projectile 50 includes a cartridge 58 wherein an ignition system 60 is located.

Referring now particularly to FIG. 2A, an expanded, more detailed, schematic view of the cartridge 58 and ignition system 60 is shown. The ignition system 60 includes a first initiator 61, an electronics module 9, the second initiator 70 and a main charge ignition 67. The first initiator 61 includes an ignitor tube translation system 64, a firing contact 62, and a first initiator charge 90. The ignitor tube translation system 64 includes an exterior tube 402 at least partially movably sheathed around an interior tube 404. Attached to the electronics module 9 is a safety sensor 80 and a pressure sensor 105. The main charge ignition 67 further includes a second initiator 70 and a candelabra ignitor 102. The safety sensor 80 is coupled to the electronics module 9 by wire 97. The pressure sensor 105 is coupled to the electronics module 9. Similarly, the second initiator 70 is coupled to the electronics module by conductor 92.

The electronics module 9 may advantageously comprise analog and/or digital electronics, or both for implementing algorithm 10. Alternatively, the electronics module may include a CPU processor programmed to carry out the steps of algorithm 10. A memory or look up table may be used to store the temperature profile of a selected cartridge. Those skilled in the art, having the benefit of this disclosure, will understand that several equivalent embodiments of the invention are contemplated herein. For example, in the case of an electrically fired cartridge, like the 120 mm M256 Tank Cannon, the electronics module can be completely powered from the firing pulse. In contrast, for a percussion fired cartridge, the power for the electronics can be contained in the cartridge but can be isolated by a mechanical switch which can be thrown when the firing pin strikes the primer.

The delay between the first and second initiator firings is a function of temperature. Longer delays allow more forward movement of the projectile, thereby increasing free volume. The delay is typically longer at higher temperatures than at lower temperatures, so that more free volume is available to keep the pressure low. It follows that the delay is shorter at lower temperatures, so that there is less volume, increasing the performance. Temperature profiles for different cartridge types will vary and event timing will vary accordingly. Useful second event timing may advantageously be derived empirically from data such as is shown below with reference to FIG. 6. For example, about a 5 millisecond delay between firing of the first and second events has been shown to improve performance of the standard shell measured tested in the temperature ranges shown in FIG. 6. Those skilled in the art and having the benefit of this disclosure will understand that other cartridge types may require different, and widely varying, timing delays.

The ignitor tube translation system 64 of the example embodiment includes two interlocking tubes 402, 404 which contain a small propellant charge 90. The translation mechanism is dependent upon the geometry of the projectile and cartridge in which a dual event ignition system is integrated. The first initiator 61 ignites the small propellant charge 90, moving the projectile forward. Any other system which moves the projectile forward without igniting the main charge can be used.

Since a dual event ignition system constructed for a particular cartridge will use the same propellant charge over all temperatures, the safety sensor 80 may advantageously be integrated into the system to ensure that the first ignitor functions properly before the second ignitor is initiated. In one embodiment, a ring movement sensor coupled to the translator tubes opens a circuit in the electronics module after the projectile translates forward and separates the interlocking tubes. The open circuit serves as a signal to subsequently arm the second ignitor. A second embodiment consists of a simple plug which is shorted when attached to the rear of the projectile and is pulled from the projectile by the translation event, thereby opening the circuit.

Figure 3:
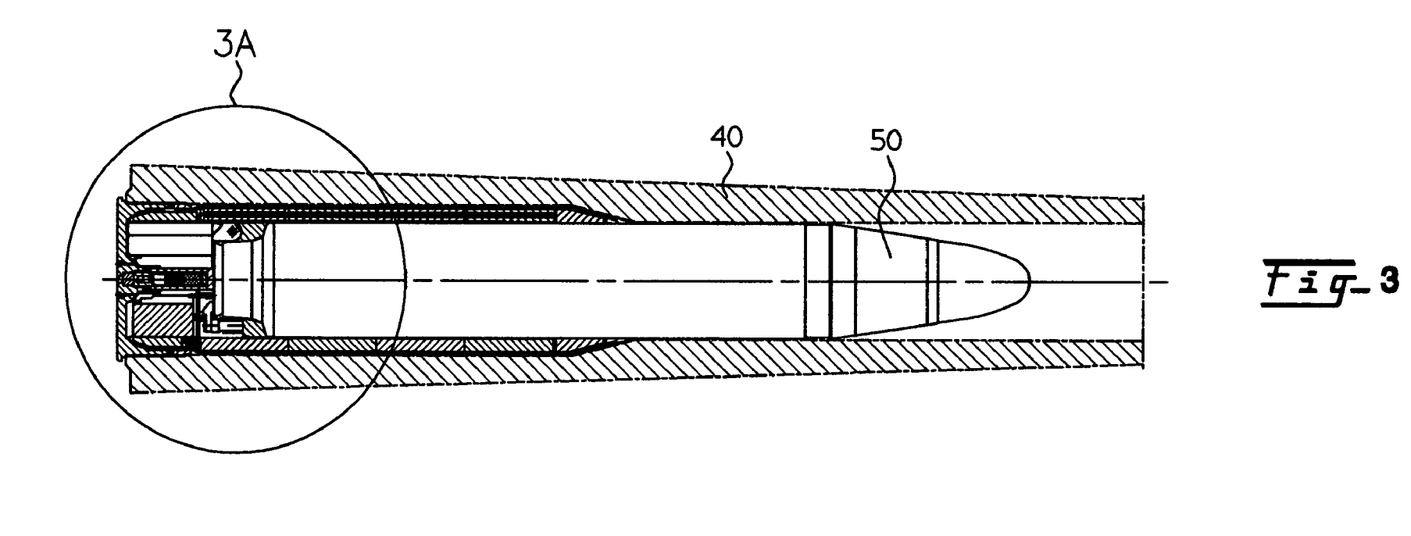
FIG. 3 schematically shows a view of an example of a cartridge system constructed in accordance with the present invention in an initial cartridge configuration.
Figure 3A:
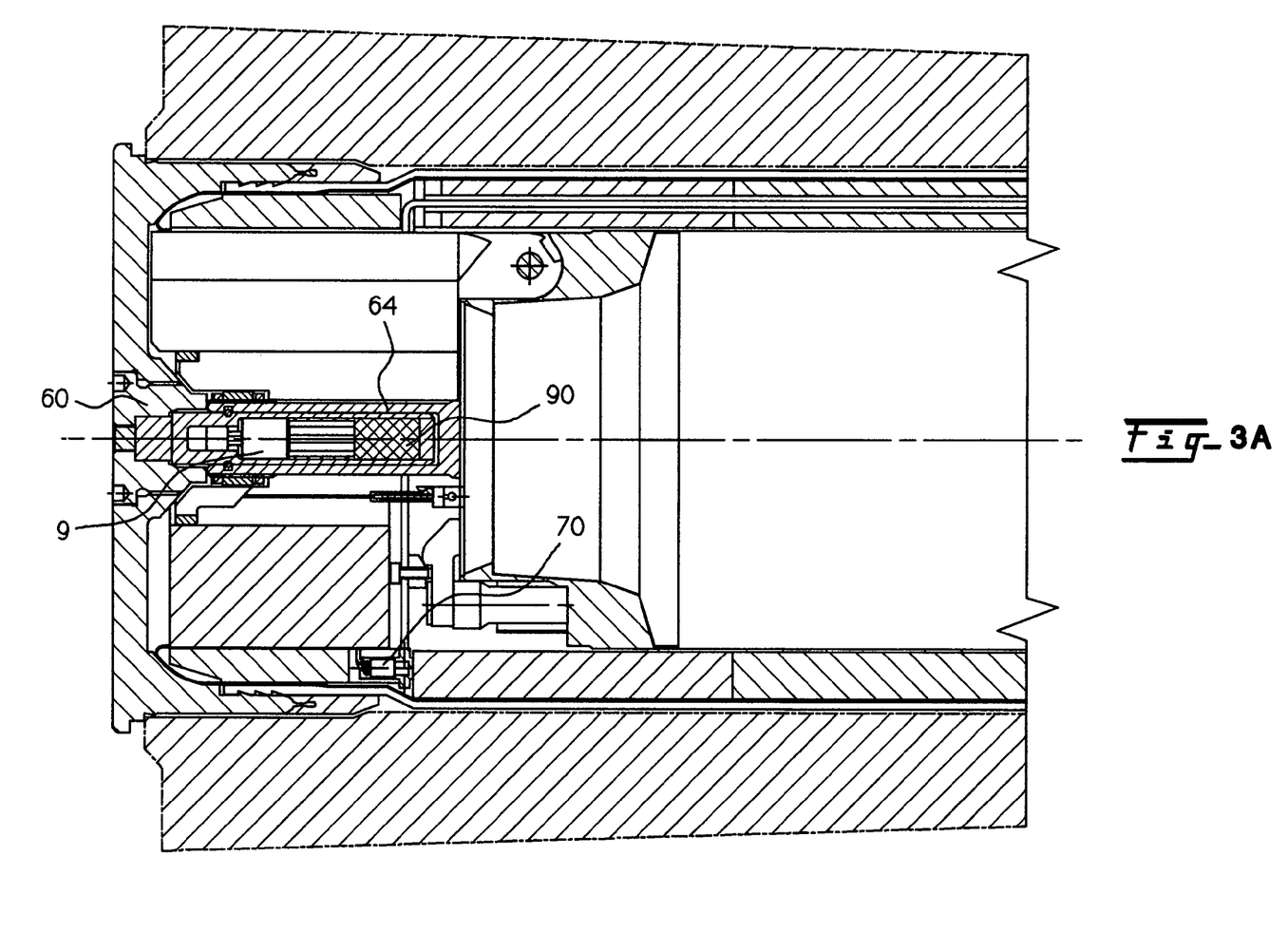

Referring now to FIG. 3, a schematic view of an example of a cartridge system constructed in accordance with the present invention in an initial cartridge configuration is shown. A projectile 50, with a cartridge having an electronic multi-pulse ignition system 60 is placed within a gun tube 40 prior to ignition of the first ignitor.

Figure 4:
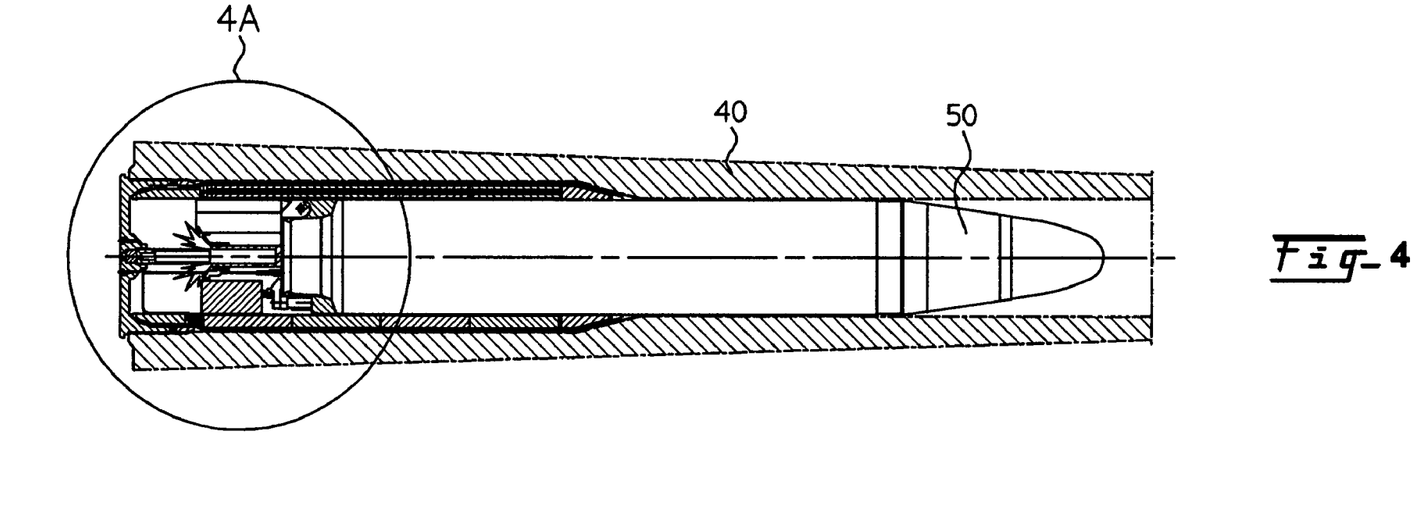
FIG. 4 schematically shows an example of a cartridge system constructed in accordance with the present invention in a translational cartridge configuration.
Figure 4A:
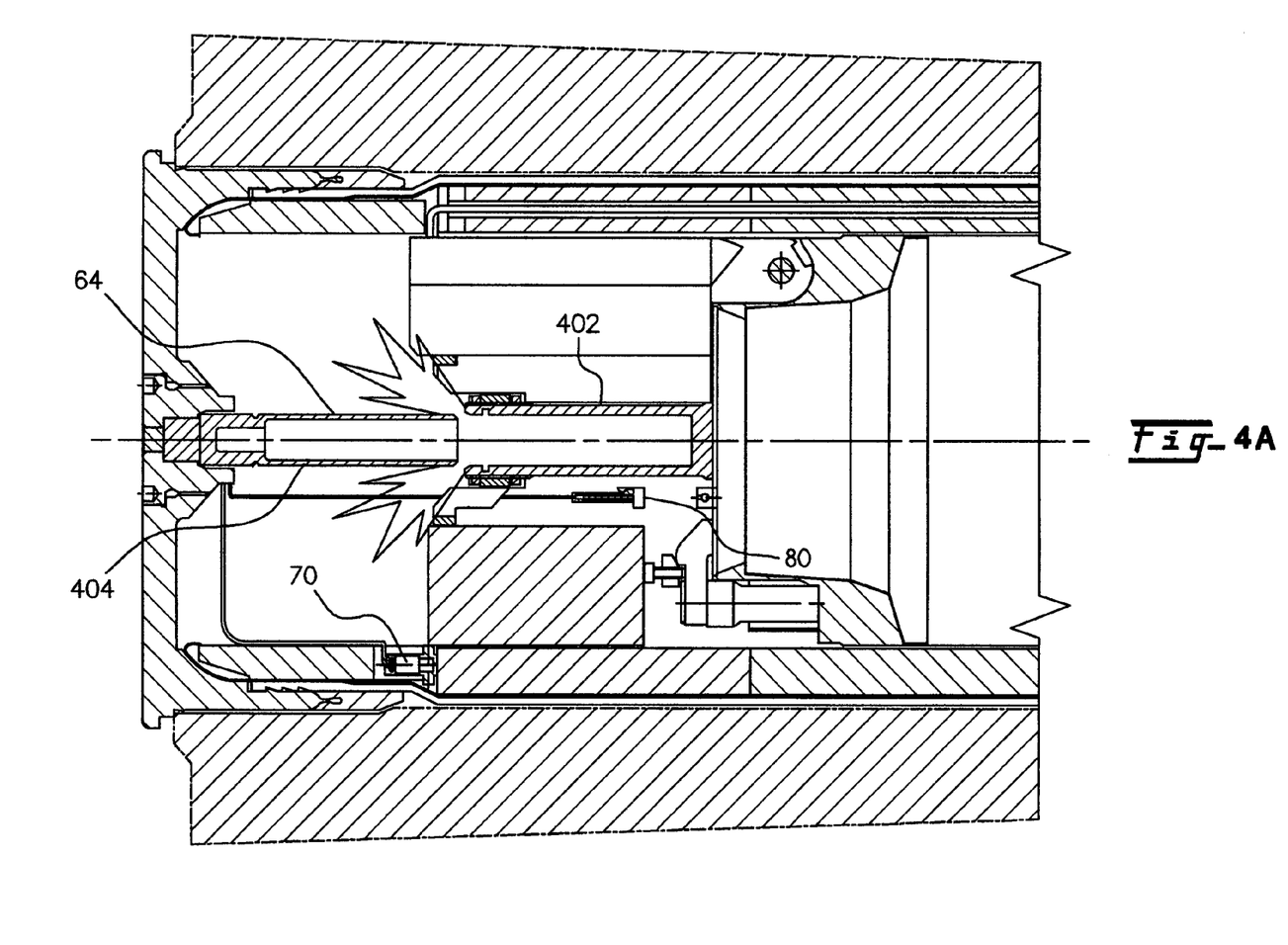

Referring now to FIG. 4, an example of a cartridge system constructed in accordance with the present invention in a translational cartridge configuration is shown schematically. FIG. 4 shows events after firing of the first ignitor charge 90. It can be seen that the projectile 50 is moving forward with respect to the initial position. In operation, as exterior tube 402 moves forward it separates from interior tube 404. Safety sensor 80, being also mechanically coupled to the ignitor tube translation system 64, then operates to send a movement sensor activation signal to the electronics module 9 to indicate whether or not it is safe to fire the second ignitor 70, as explained above with respect to the process flow diagram of FIG. 1. At the same time, the pressure from firing the first ignitor charge 90 activates a signal in an optional pressure sensor 105 indicating that it is safe to trigger the second initiator 70 for firing the main charge ignition system 67.

Figure 5:
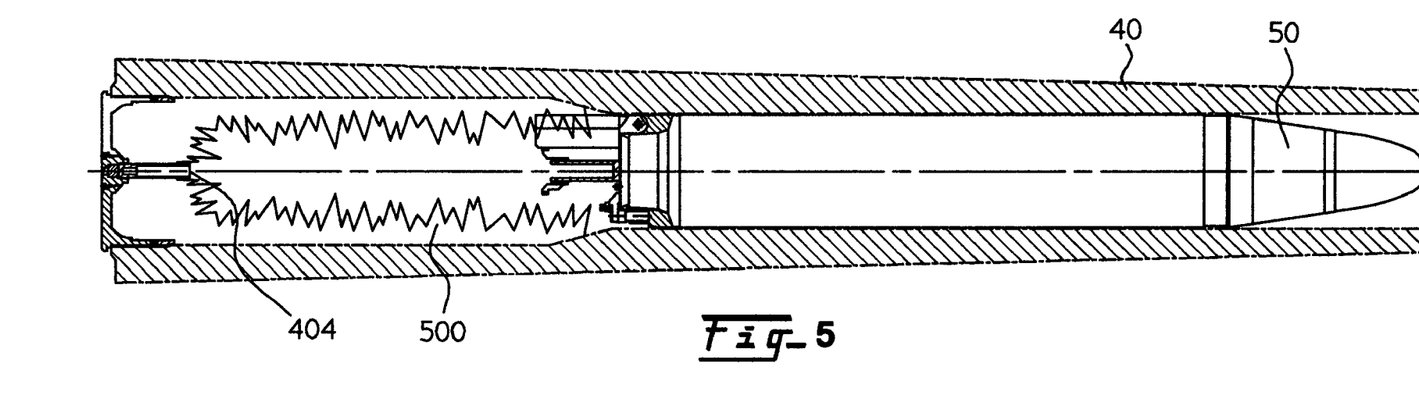
FIG. 5 schematically shows a view of one example of a cartridge system constructed in accordance with the present invention in a cartridge configuration after main charge ignition.

Referring now to FIG. 5, a schematic view of one example of a cartridge system constructed in accordance with the present invention in a cartridge configuration after main charge ignition is shown. As shown in FIG. 5, the cartridge is launched by firing of the main charge ignition system as indicated generally by flame indicators shown as shading 500. In accordance with this example of the invention, the main charge ignition system is not lit until after a count down period after firing of the first initiator.

Figure 6:
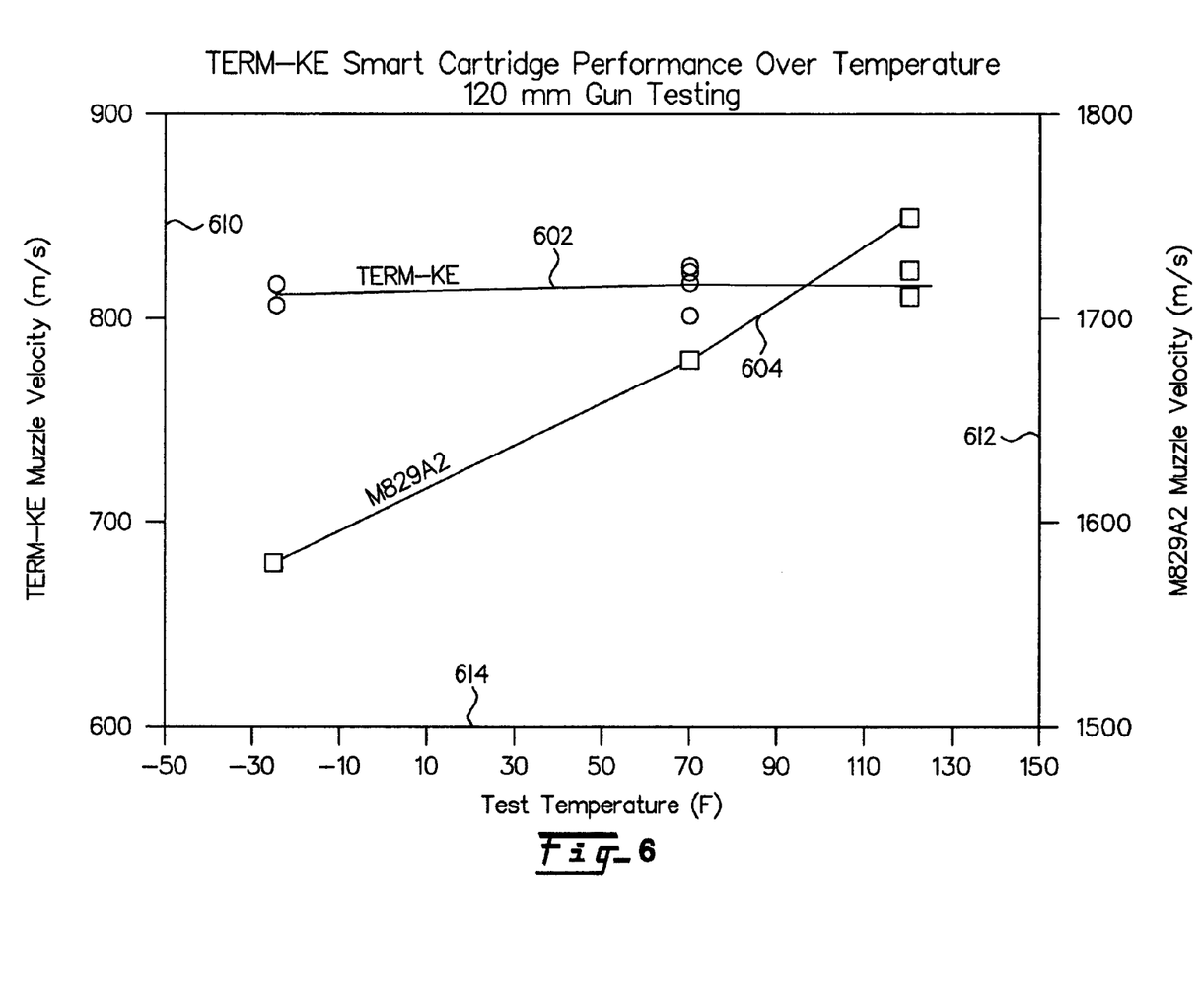
FIG. 6 graphically shows a comparison of one example of performance of a cartridge system constructed in accordance with the present invention against a conventionally ignited cartridge.

Referring now to FIG. 6, a graphical comparison of one example of performance of a cartridge system constructed in accordance with the present invention against a conventionally ignited cartridge is shown. The FIG. 6 graph includes a first vertical axis 610, second vertical axis 612 and a horizontal axis 614. Also shown are a first curve plotted curve 602 and second plotted curve 604. The first vertical axis 610 indicates muzzle velocity in meters per second for a first cartridge, namely, model TERM-KE. The second vertical axis 612 indicates muzzle velocity in meters per second for a second cartridge, namely, model M829A2.

The TERM-KE cartridge, plotted on curve 602, incorporates the electronic multi-pulse ignition system of the invention, and the M829A2 cartridge, plotted on curve 604, is a conventional ignition system typical of high performance 120 mm tank ammunition. Horizontal axis 614 indicates test temperatures in degrees Fahrenheit. Note that test data for temperatures between −25 degrees F. and +120 degrees F. shows the TERM-KE cartridge maintained essentially the same muzzle velocity while the conventional M829A2 cartridge showed a drop of over 10% in muzzle velocity as the temperature diminishes.

What is claimed is:

1. A method for igniting a cartridge to launch a projectile using a first initiator and a second initiator, wherein the cartridge has a temperature sensor and a temperature performance profile, comprising the steps of:
   transmitting a firing pulse to fire the first initiator;
   providing a signal from the first initiator to a decision event for receiving current temperature data from the temperature sensor, and determining a delay by comparing the current temperature data with the temperature performance profile;
   counting down the delay; and
   transmitting a firing signal to fire the second initiator when the count down of the delay is complete.

2. The method of claim 1 wherein the firing pulse comprises a percussion firing pulse.

3. The method of claim 1 wherein the step of counting down the delay further comprises the steps of:
   (a) determining whether pressure conditions meeting a predetermined safety criterion are present in the cartridge before firing the second initiator; and
   (b) determining whether forward movement of the projectile satisfy a predetermined safety criterion before firing the second initiator.

4. The method of claim 1 where the firing pulse comprises an electronic firing pulse.

5. The method of claim 1 further comprising the step of operating a movement sensor while counting down the delay to determine whether forward movement of the projectile satisfies a predetermined safety criteria to allow firing the second initiator.

6. The method of claim 1 wherein firing the first initiator triggers a translation mechanism having two interlocking tubes containing a propellant charge, where the two interlocking tubes include an exterior tube and an interior tube where the exterior tube moves forward and separates from interior tube so that a safety sensor mechanically coupled to the exterior tube then operates to send a movement sensor activation signal to indicate whether it is safe to fire the second initiator.

* * * * *